Figure 1:
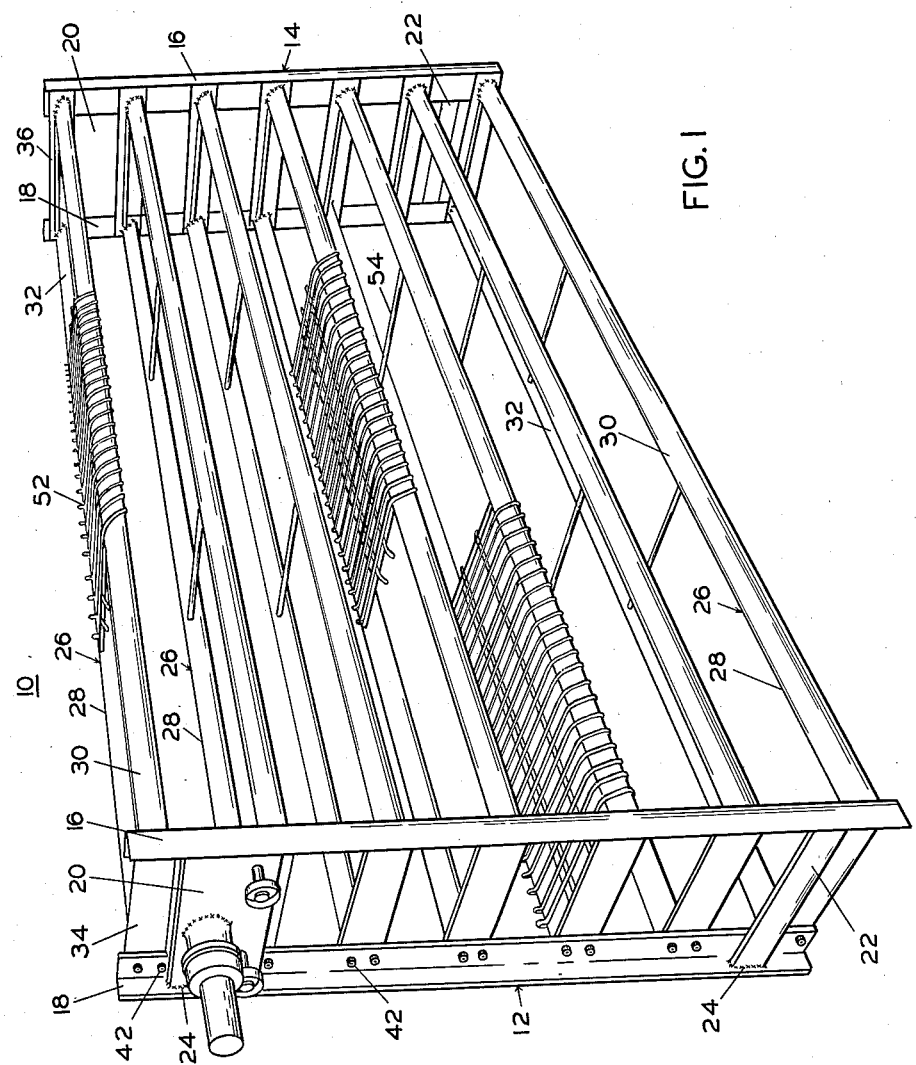

Nov. 7, 1961

D. C. GRAHAM 3,007,583

BREAD SUPPORTING RACK

Filed Aug. 5, 1959

2 Sheets-Sheet 2

INVENTOR.
DONALD C. GRAHAM
BY Otto Moeller
Attorney

United States Patent Office 3,007,583
Patented Nov. 7, 1961

3,007,583
BREAD SUPPORTING RACK
Donald C. Graham, Dover, Pa., assignor to Capitol Products Corporation, Mechanicsburg, Pa., a corporation of Pennsylvania
Filed Aug. 5, 1959, Ser. No. 831,766
1 Claim. (Cl. 211—134)

This invention relates to bakery racks and more particularly to racks having a plurality of vertically spaced shelves for supporting freshly baked bread loaves, the racks being pendently supported at their upper opposed ends and movable through a bread cooling chamber.

Each of the shelves of the racks includes a front and rear transversely extending element secured at its ends to an end frame member, and bread supporting grid members spanning and attached to the front and rear shelf elements. Such bread cooling racks may be as much as nine or more feet in width, so that to prevent sagging of the rack between their ends, the transverse shelf elements have been made of steel tubng to provide the necessary strength. A bread cooler may have, for example, twenty such racks, and when made of steel elements they are of course very heavy, resulting in high transportation costs and make assembly thereof in the cooler arduous and expensive. Furthermore, such heavy racks also necessitate heavy structural elements for supporting and operating the racks in the cooler. It is, therefore, an object of the invention to provide a relatively light-weight but sturdy rack wherein various elements of the rack, particularly the transverse shelf elements are made of aluminum.

It is very important that the overall height of the rack for a specified number of shelves, seven shelves for example, be maintained at a minimum while providing sufficient clear space between the shelves for introduction of the bread loaves. To provide for minimum deflection of the rack, round tubular aluminum transverse shelf elements would either be of such large cross sectional area as to make it necessary to increase the overall height of the rack to provide the required clear space between shelves, or the wall must be of such thickness as to make the material and manufacturing cost prohibitive. It is, therefore, another object of the invention to provide a rack construction wherein the aluminum transverse shelf elements are so formed that the rack will have a minimum deflection, a minimum overall height and that can at the same time be economically manufactured. A related object is to provide a rack construction embodying transverse shelf elements affording the foregoing advantages and that at the same time meet the most rigid sanitary requirements by eliminating surfaces on which crumbs can collect.

Another object is to provide a rack of the foregoing type of knock-down construction made up of pre-assembled welded units facilitating storage, shipping and handling, and that are readily and conveniently assembled in the field.

Figure 2:
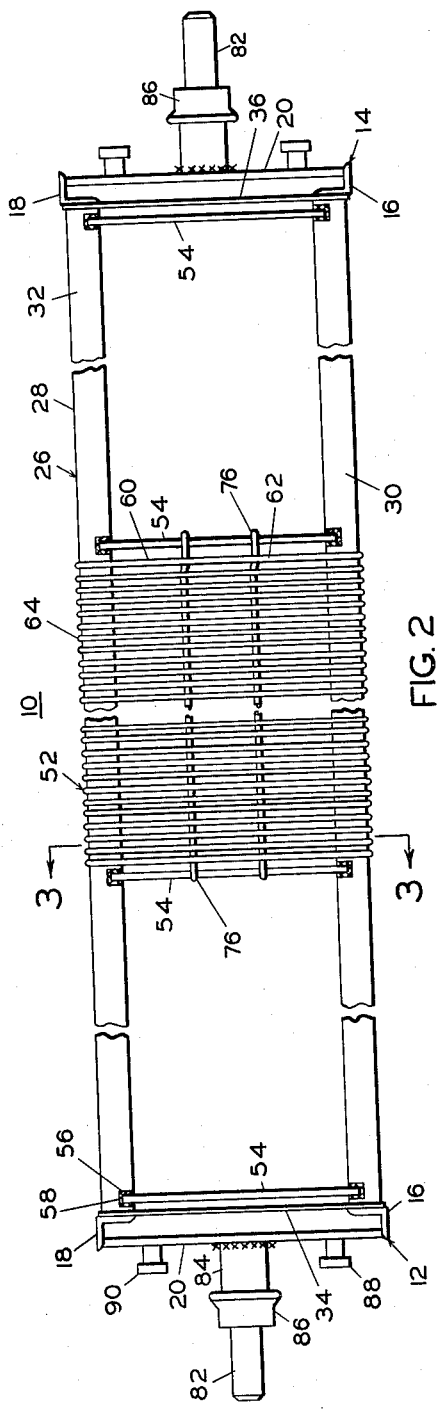
Figure 3:
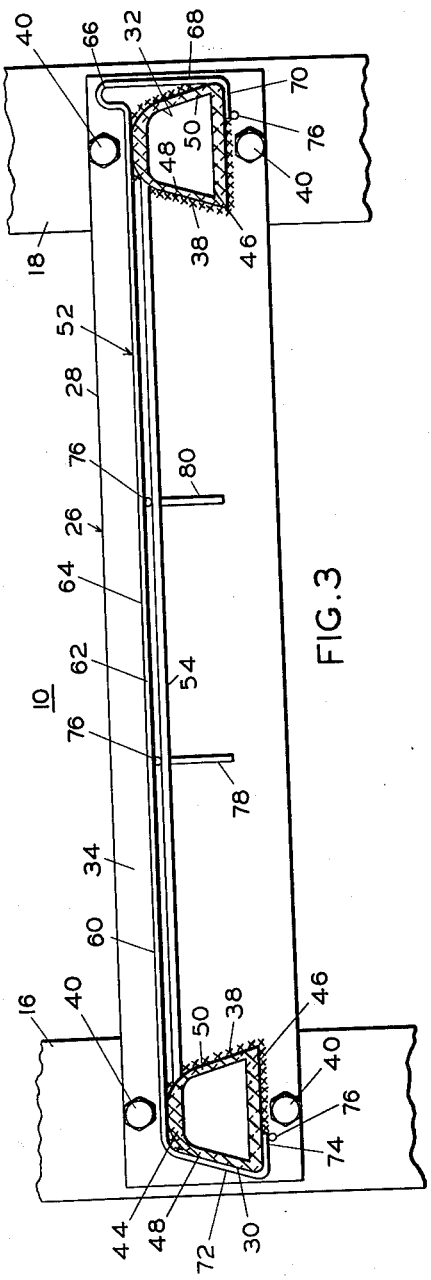

Other objects and advantages reside in certain novel features of the construction, arrangement and combination of parts which will be hereinafter more fully described, reference being had to the accompanying drawings forming a part of this specification, and in which drawings:

FIGURE 1 is a view in perspective of the rack embodying the present invention;
FIGURE 2 is a plan view of the rack; and
FIGURE 3 is a sectional view taken on line 3—3 of FIGURE 2.

After bread has been baked and de-panned it must be cooled before it can be sliced and wrapped. In large commercial bakeries, a convenient means for handling the bread loaves includes a plurality of racks on the superimposed shelves of which the hot loaves of bread are delivered. The racks are pendently supported and transported in a closed path during the cooling operation, after which the cooled loaves are removed from the shelves of the rack. Apparatus for transporting, loading and unloading such racks is shown in D. S. Baker Patent No. 1,837,605, granted December 22, 1931 and H. E. Temple Patent No. 2,823,811, granted February 18, 1958, and is not shown or described in the present application, since the present invention is concerned only with the novel construction of the racks.

The rack, designated as a whole by the numeral 10, is rectangular in form and includes a pair of laterally spaced, vertically extending similar end frames 12 and 14. Each of the end frames 12 and 14 includes vertical front and rear frame members 16 and 18 constituting the four vertical corner edges of the rack 10. The vertical frame members 16 and 18 are preferably in the form of angle members which are preferably made of aluminum to effect over-all reduction in the weight of the rack. Completing the end frames 12 and 14 are upper and lower plate members 20 and 22 connecting the front and rear frame members 16 and 18 and to which they are rigidly secured by weldments 24.

Between the end frames 12 and 14, the rack 10 is provided with a plurality of horizontal superimposed equidistantly spaced shelves 26, seven such shelves being shown in the drawings. Each of the shelves 26 includes a rectangular frame 28 formed by spaced parallel transversely extending front and rear tubular members 30 and 32 of extruded aluminum, the ends of the tubular members 30 and 32 abutting the planar surfaces of end plate members 34 and 36 and to which they are rigidly secured by weldments 38, as shown in FIGURE 3. End plate members 34 and 36 are preferably formed of aluminum.

The shelf frames 28 are securely but detachably connected to the end frames 12 and 14 by any suitable means, as by cap screws 40 extending through the end plate members 34 and 36 of the shelf frames 28 and the vertical angle members 16 and 18 of the end frames 12 and 14, the frames 12, 14 and 18 being drawn tightly together by nuts 42 threaded on the projecting ends of the cap screws 40. The shelf frames 28 and the end frames 12 and 14 are thus formed as rigid individual units that can be compactly stored and compactly loaded for shipment, that are more conveniently handled, and that are easily assembled in the field.

As previously stated, the front and rear tubular members 30 and 32 of the shelf frames 28 are formed as aluminum extrusions to reduce the overall weight of the racks. The racks 10 are of considerable width, so that the shelves 26, which may be as much as nine feet or more in width, may accommodate a large number of closely spaced side by side loaves of bread. Conventional racks are usually made of steel tubing which has stress and strain resistant characteristics far superior to those of aluminum tubing of the same cross section area, so that in such constructions small diameter tubes may be employed for the shelf frames. Were round aluminum tubing to be used for the shelf frame, the diameter necessary to prevent deflection or sagging of the rack would be such as to materially increase the overall height of the rack; or the wall thickness, if the diameter is materially decreased, would be such as to make the material and manufacturing costs prohibitive. The shelf frame members 30 and 32 are therefore of such configuration as to provide maximum resistance to deflection with a minimum of material, and a minimum vertical height to keep the overall height of the rack at a minimum while providing sufficient clear space between the shelves for introduction of the bread loaves. At the same time the frame members 30 and 32 are configured to avoid any surface on which crumbs can collect.

All of the shelf frame members 30 and 32 are identical in configuration and in describing one of the shelf frame members 30, it will be understood that it applies to all the shelf frame members. The shelf frame member 30, as best shown in FIGURE 3, has a top wall portion 44 having an upper surface convex in cross section and formed on a radius of curvature to prevent collection thereon of crumbs that flake off the bread loaves; a horizontal planar bottom wall portion 46 of greater width than the top wall portion 44, and diverging side wall portions 48 and 50 joining the side edges of the top wall portion 44 and the bottom wall portion 46. The top and bottom wall portions 44 and 46 have a thickness substantially in excess of the thickness of the side wall portions 48 and 50, and the width of the bottom wall portion is substantially in excess of the greatest vertical distance between the convex top wall portion 44 and the bottom wall portion 46.

For a seven shelf rack weighing approximately 350 pounds, with shelves 9 feet in width and 17½ inches from front to back, and 6½ inches clear space between the shelves, the aluminum shelf frame members 30 and 32 preferably have an overall height of 1½ inches, the cross sectional width of the bottom wall 46 being 2 inches with a thickness of .156 inch, and the side walls 48, 50 having a thickness of .062 inch. While these dimensions are preferred, it will be apparent that they may be modified to some extent.

The shelves 26 are completed by bread supporting grids 52 which span and are detachably secured to the shelf frame members 30 and 32. In order to facilitate handling, manufacture, assembly and replacement, each shelf 26 is provided with a plurality of grids 52, for example three grids 52. In the drawings, a number of the grids 52 have been omitted for purpose of clarity.

The shelf frame members 30 and 32 are connected by four equidistantly spaced longitudinal aluminum bars 54, the end bars 54 being disposed closely adjacent the shelf end plate members 34 and 36. The ends of the bars 54 are preferably arranged to be seated in indentations 56 formed in the convexly curved top wall portion 44 of the frame members 30 and 32 adjacent the junction of their top wall portions 44 with the side wall portions 48. The bars 54 are rigidly secured in the indentations 56 by welding 58 to form a component of the prefabricated shelf frame 28, as best shown in FIGURE 2. The bars 54 maintain the desired spacing between the front and rear frame members 30 and 32 and provide means for anchoring the ends of the grids 52, facilitating proper locating of the grids 52 and preventing lateral displacement thereof relative to the shelf frame 28.

The grids 52 are formed by a plurality of primary closely spaced rods 60 having longitudinally extending sections 62 spanning the front and rear frame members 30 and 32 to form a horizontal bread loaf supporting floor 64. At their rearward ends each of the rods 60 has an upwardly extending inverted U-shaped section 66, collectively forming a rear wall 68 which acts as a stop for loaves of bread placed on the supporting floor 64. The primary rods 60 are arranged in spaced, substantially parallel relation, being sufficiently close together to provide adequate support for loaves of bread and being sufficiently small to minimize interference with the circulation of cooling air around the loaves and to minimize condensation of moisture on the rods.

The rearward legs of the inverted U-shaped sections 66 of the primary rods 60 extend downwardly across the rear side wall 50 of the rear frame member 32, and terminate in forwardly bent sections 70 arranged to engage the under side of the bottom wall portion 46 of the rear frame member 32, as best shown in FIGURE 3. At their forward ends, the primary rods 60 are formed with downwardly bent sections 72 extending across the front side wall 48 of the front frame member 30, and terminate in rearwardly bent sections 74 arranged to engage the under side of the bottom wall portion 46 of the front frame member 30.

The primary rods 60 of each of the grids 52 are interconnected by secondary rods 76 which extend transversely of the primary rods 60 and are arranged in spaced substantially parallel relation, four such secondary rods being shown. The primary and secondary rods are secured together by welding, not shown. Two of the secondary rods 76 specifically those disposed beneath the sections 62 of the primary rods 60 are provided at their opposite ends with downwardly extending hook sections 78 and 80 which are hooked over the bars 54 for orienting the grids 52 and preventing lateral displacement thereof with respect to the shelf frame 28.

The grids 52 may be readily mounted on the shelf frames 28 by merely placing them on the frames with the front end hooked over the front frame member 30 so that the inturned sections 74 of the rods 60 engage the bottom wall portion 46 of the front frame member 30. The rearward legs of the inverted U-shaped sections 66 of the rods 60 will spring sufficiently when the rearward end of the grids 52 are forced downward, the inturned sections 74 will ride down along the sloping side wall 50 of the frame member 32 and snap under and in engagement with the bottom wall portion 46 of the frame member 32.

Each of the upper plate members 20 is provided intermediate its ends with an outwardly projecting shaft 82 mounted in a sleeve 84 which is welded to a respective plate member 20. The projecting shafts 82 provide means through which the conveying system (not shown) supports the racks in raising and lowering them in their conveyance through a closed path in the cooler. Wheels 86 rotatably mounted on the shafts 82, may be provided for engagement with suitable guides, not shown, for guiding the racks during such raising or lowering.

In addition, each of the upper plate members 20 also supports a pair of outboard rollers 88 and 90, located respectively at opposite sides of the shaft 82 and disposed in a plane below the lever of the plane of shaft 82. The rollers 88 and 90 are adapted to ride on longitudinally extending tracks (not shown) for supporting the racks along the longitudinal reaches of their closed path through the cooler.

From the foregoing, it will be apparent that I have provided a light weight but sturdy rack for supporting bread loaves as the racks are pendently moved in a closed path through a cooler. The rack is comprised of several rigid sub-assemblies providing convenient storage, shipping and handling, and which assemblies are readily assembled in the field.

Although I have disclosed an exemplary embodiment of my invention herein for purpose of illustration, it will be understood that various changes, modifications and substitutions may be incorporated therein without necessarily departing from the spirit of the invention.

I claim:

A baker's rack comprising an open framework having upright end frames and a plurality of vertically spaced substantially horizontal shelves extending between and connected to said end frames, said shelves each having spaced front and rear hollow frame members formed in cross section with a convexly curved top wall, a planar bottom wall and side walls connecting the ends of said top and bottom walls, and a grid supported by and spanning said front and rear frame members, said grid comprising a plurality of spaced resilient rods, said rods having end portions including downturned sections adjacent the outer side walls of said hollow frame members and inturned terminal sections underlying the planar bottom wall of said hollow frame members, said grid being installed by outward springing of an end portion of said resilient rods.

References Cited in the file of this patent

UNITED STATES PATENTS

| | | |
|---|---|---|
| 1,021,432 | Smith | Mar. 26, 1912 |
| 1,655,593 | Bulman | Jan. 10, 1928 |
| 1,891,740 | Westerman | Dec. 20, 1932 |
| 1,990,629 | Bales | Feb. 12, 1935 |
| 2,702,127 | Pastorius | Feb. 15, 1955 |
| 2,738,873 | Emmerich | Mar. 20, 1956 |
| 2,893,567 | Steele | July 7, 1959 |